(12) United States Patent
Sotgiu (10) Patent No.: US 9,610,804 B2
(45) Date of Patent: Apr. 4, 2017

(54) AUTOMATIC ANTI-SLIPPING SYSTEM AND AUTOMATIC ANTI-SLIPPING METHOD

(75) Inventor: Paolo Sotgiu, Modena (IT)

(73) Assignee: SNAP-ON EQUIPMENT SRL A UNICO SOCIO, Correggio (RE) (IT)

( * ) Notice: Subject to any disclaimer, the term of this patent is extended or adjusted under 35 U.S.C. 154(b) by 1410 days.

(21) Appl. No.: 13/430,333

(22) Filed: Mar. 26, 2012

(65) Prior Publication Data

US 2013/0248120 A1 Sep. 26, 2013

(51) Int. Cl.
*B60B 30/00* (2006.01)
*B60B 30/06* (2006.01)

(52) U.S. Cl.
CPC ........ *B60B 30/06* (2013.01); *B60B 2900/541* (2013.01)

(58) Field of Classification Search
CPC . B60C 25/00; B60C 25/0533; B60C 25/0536; B60C 25/0542; B60C 25/132; B60C 25/0545; B60C 25/135; B60C 25/138; B60C 25/05; B60C 25/053; B60C 25/0539; B60B 29/00; B60B 3/00; B60B 3/06; B60B 30/00; B60B 30/06; B60B 2900/541; G01M 17/021; G01M 17/013; G01M 17/02
USPC .............................................. 157/14, 16, 18
See application file for complete search history.

(56) References Cited

U.S. PATENT DOCUMENTS

| | | | |
|---|---|---|---|
| 2,178,101 A | 10/1939 | Hatch | |
| 2,609,039 A * | 9/1952 | Henderson | B60C 25/132 157/1.24 |
| 2,895,519 A * | 7/1959 | Coats | B60C 25/135 157/1.26 |
| 3,255,800 A * | 6/1966 | Strang | B60C 25/132 157/1.24 |
| 3,474,840 A * | 10/1969 | Scott | B60C 25/135 157/1.24 |
| 3,583,238 A * | 6/1971 | Haynes | G01M 1/045 157/21 |

(Continued)

FOREIGN PATENT DOCUMENTS

| | | |
|---|---|---|
| EP | 0533986 A1 | 3/1993 |
| EP | 2 065 230 A1 | 6/2009 |
| JP | 2013142674 A * | 7/2013 |

OTHER PUBLICATIONS

European Search Report issued in European Patent Application No. 12161324.4 dated Aug. 17, 2012.

*Primary Examiner* — Hadi Shakeri (74) *Attorney, Agent, or Firm* — McDermott Will & Emery LLP (57) ABSTRACT

An automatic anti-slipping system for a rotationally fixed attachment of a rim of a wheel in a wheel service machine, comprises a wheel supporting and rotating means (20), for supporting and rotating a wheel to be serviced. At least two driving pins (32) are provided at the wheel supporting and rotating means (20) for reversibly generating a rotationally fixed connection between a wheel supporting and rotating means (20) and a rim of a wheel to be serviced, wherein at least one of the at least two driving pins (32) is adapted to come in a positive locking engagement with at least one recess of a rim, and wherein the at least two driving pins (32) are adapted to be reversibly moveable, and actuator means (40) are able to reversibly move the driving pins (32) in an actuated state.

12 Claims, 4 Drawing Sheets

(56) References Cited

U.S. PATENT DOCUMENTS

| | | | | |
|---|---|---|---|---|
| 3,685,565 | A | * | 8/1972 | Sorenson ............... B60C 25/132 157/1.24 |
| 3,847,198 | A | | 11/1974 | Brosene, Jr. |
| 4,093,311 | A | * | 6/1978 | Maus .................... G01M 1/045 157/14 |
| 4,187,895 | A | * | 2/1980 | Saruwatari ............. B60B 31/02 157/1.55 |
| 4,299,265 | A | * | 11/1981 | Alm .................... B60C 25/0545 157/1.1 |
| 4,304,285 | A | * | 12/1981 | Alm .................... B60C 25/0545 157/14 |
| 4,478,081 | A | * | 10/1984 | Greene ................ G01M 1/045 157/21 |
| 5,033,003 | A | * | 7/1991 | Lees, Sr. ................ G01M 1/02 33/203.18 |
| 5,656,775 | A | * | 8/1997 | Kawabe .................. B60B 30/06 157/14 |
| 5,921,304 | A | * | 7/1999 | Nipper .................... B60C 25/01 157/16 |
| 2003/0116625 | A1 | * | 6/2003 | Litwiller ................. B65H 1/00 235/444 |
| 2006/0082018 | A1 | * | 4/2006 | Regev ..................... B26D 5/00 264/259 |

\* cited by examiner

AUTOMATIC ANTI-SLIPPING SYSTEM AND AUTOMATIC ANTI-SLIPPING METHOD

TECHNICAL FIELD

The invention relates to an improved automatic anti-slipping system and an improved anti-slipping method. Both, the automatic anti-slipping system and the anti-slipping method can be used with tire service machines.

BACKGROUND

A tire service machine, in particular a tire fitting machine, using an anti-slipping system of that kind is known from EP patent application 2 065 230, for example. This known tire fitting machine has a wheel mounting means which is mounted rotatably about a vertical axis and to which a wheel rim can be fixed when fitting or removing a tire, while the wheel rim rests on a support surface of the mounting means. Said support surface extends perpendicularly to the vertical axis of the tire service machine. Furthermore, on the support surface, a single driving pin is located, which is able to engage with a wheel bolt hole of a rim mounted to the rim mounting device. Said driving pin is able to transfer torque and rotary motion from the rim mounting means to the rim or wheel. Moreover, this driving pin can be swiveled around a vertical axis in order to bring the pin in a correct position for being aligned with the wheel bolt hole of the rim.

However, while mounting a rim on the conventional rim mounting means, an operator has to check the correct engagement of the single driving pin with the wheel bolt hole of the rim. In case the correct engagement is not achieved incidentally in the first place, the operator has to manually adjust a rim or the wheel, or even has to move the single driving pin as long as correct locking and engagement of a rim are achieved, which means the single driving pin finds its engagement with the wheel bolt hole of the rim. This constitutes a permanent source of error, is troublesome and furthermore provides a risk of damaging a sensitive rim of a wheel to be serviced, for example when dealing with light-metal-alloy rims. Said damage can occur as soon as a surface of a rim of a wheel to be serviced is moved relative to the support surface of the tire service machine in order to reach engagement of the driving pin with a wheel bolt hole of a rim. Furthermore, in case the driving pin is not properly engaged in a rim of a wheel to be serviced, a wheel clamping means has to be tightened strongly against a rim, which also causes damaging for sensitive rims.

SUMMARY

Therefore, it is an object of the present invention to prevent a rim of a wheel from being damaged by slipping, without being tightened stronger onto the tire service machine, by means of a flexible improved automatic anti-slipping system which can be adapted to different types of rims. Further it is an object of the present invention to improve the automatic anti-slipping method for a rim of a wheel to be serviced. In accordance with the invention, that object is solved by an automatic anti-slipping system according to claim 1, and a method according to claim 13. The dependent claims refer to further developments of the invention.

In a first aspect, the invention provides an automatic anti-slipping system for a rotationally fixed attachment of a rim of a wheel in a wheel service machine, comprising a wheel supporting and rotating means for supporting and rotating around its rotary axis a wheel having a central axis, wherein a rim of a wheel to be serviced can be placed onto a rim supporting surface of the wheel supporting and rotating means. At least two driving pins are provided at the wheel supporting and rotating means for reversibly generating a rotationally fixed connection between the wheel supporting and rotating means and a rim of a wheel to be serviced, wherein at least one of the at least two driving pins is adapted to come in a positive locking engagement with at least one recess of a rim when coinciding with said recess of a rim and wherein the at least two driving pins are adapted to be reversibly moveable in a direction parallel to the rotary axis of the wheel supporting and rotating means. Actuator means are able to move reversibly the driving pins in an actuated state, therefore, the actuator means apply an actuating force used to actuate the driving pins.

The wheel service machine can be a tire changer, a wheel balancer, or any other type of wheel service machine requiring rotation of the wheel to be serviced and mounted to the driving shaft of the wheel service machine. Generally, a rim of a wheel to be serviced is placed onto the wheel supporting and rotating means, which is in general rotatably coupled to a driving shaft of the wheel service machine. At least the rim supporting surface of the wheel supporting and rotating means extends perpendicularly to the axis of the tire service machine. The driving shaft as well as the tire service machine can be arranged in a vertical orientation, in a horizontal orientation or in any other orientation between the horizontal and vertical orientation depending on the configuration of the wheel service machine, the present invention shall be used with.

The positive locking engagement of at least one driving pin with at least one recess of a rim to be serviced offers the possibility to service sensitive rims, for example light-metal-alloy rims, polished or brushed rims or rims showing a coat of varnish. Especially when dealing with sensitive rims which cannot be tightened properly against a wheel supporting and rotating means for supporting and rotating a rim because the risk of damaging a surface of a rim, contacting the wheel supporting and rotating means or any centering means, the support by an anti-slipping system is desired.

In a further aspect of the present invention, a plurality of driving pins are provided at the wheel supporting and rotating means. In general, the driving pins may have a cylindrical shape, whereas any other geometry like a pyramidal, round or conical form are imaginable. Preferably, the driving pins have equal shape. However, they may also have different shapes: for instance, in the case when they have a cylindrical shape, they may have different diameters. The driving pins are reversibly moveable in openings provided in the wheel supporting and rotating means. Preferably, cylindrical driving pins are reversibly moveable in cylindrical openings, which makes it possible to provide a fitting, which can be either a loose fit or a press fit, for supporting the control of the reversible motion of the cylindrical driving pins. Furthermore, the driving pins are preferably movable along a direction being parallel to the axis of the driving shaft and the wheel supporting and rotating means. The driving pins comprise a rim-side end and an actuator-side-end, and the driving pins are partially hold, preferably at their actuator-side-end, such that the pins do not fall out of the cylindrical openings in the wheel supporting and rotating means. This feature of partially holding can be executed by a blind hole forming the cylindrical opening, with the cylindrical opening being accessible at the rim-side surface. Furthermore, also a spring, a string or any other part being able to partially hold the driving pins can be provided. The spring being provided for holding the driving pin inside the cylindrical opening can also be used to spring the driving pin itself. This feature is very useful as soon as a rim of a wheel to be serviced is placed onto the supporting and rotating means.

Moreover, the driving pins are arranged at equal radiuses referred to the rotary axis of the wheel supporting and rotating means. With an arrangement of at least two driving pins arranged at equal radiuses referred to the rotary axis, it is more likely for at least one of the at least two driving pins to come into positive locking arrangement with a rim of a wheel to be serviced. Preferably in case that only one single type of rims is to be serviced, which is common practice for car-manufacturers, an arrangement of driving pins arranged at equal radiuses referred to the rotary axis is effective. With one single type of rims to be serviced, the radius of the at least two driving pins referred to the rotary axis of the wheel supporting and rotating means is constant, and the radius corresponds to the radius of the at least two recesses referred to the central axis of a rim of a wheel to be serviced. Therefore, also with at least two driving pins being arranged at equal radiuses it is likely for at least one driving pin to come into positive locking engagement with at least one recess in a rim of a wheel to be serviced.

In a further aspect of the present invention, the driving pins are arranged at different radiuses referred to the rotary axis of the wheel supporting and rotating means. With an arrangement of driving pins placed at different radiuses referred to the rotary axis, positive locking arrangement of at least one driving pin in a recess of a rim can be reached for different types of rims to be serviced.

In another aspect of the present invention, the driving pins are arranged at equal distances in circumferential direction around the rotary axis of the wheel supporting and rotating means.

However, in a further aspect of the present invention, the driving pins are arranged at different distances in circumferential direction around the rotary axis of the wheel supporting and rotating means.

Further, the driving pins can be arranged in helical shape around the rotary axis of the wheel supporting and rotating means. As already mentioned above, the driving pins can be disposed at equal or different radiuses referred to the axis of the wheel supporting and rotating means, as well as arranged at equal or different distances in circumferential direction around the rotary axis of the wheel supporting means. The positions of the driving pins in the wheel supporting and rotating means are not chosen at random, rather, they are chosen to maximize the probability that proper locking can be obtained for many different kinds of wheels. This can be achieved by considering that rim shapes may follow some geometrical patterns, according to known standards, which may result in a kind of curved arrangement of driving pins disposed in the wheel supporting and rotating means, with the axes of the driving pins being parallel to the axis of the driving shaft of a tire mounting machine. The driving pins can also be arranged adjacent to each other, segment wise, along one radial line, or in any other possible arrangement. Further the axes of the driving pins may be parallel to the driving shaft axis, however any other alignment is applicable. In general, with a plurality of driving pins being provided in different radiuses apart from each other on the wheel supporting and rotating means, for at least one driving pin it is likely to find a respective bolt hole or a recess in a rim placed onto the wheel supporting and rotating means in the first place. Further, the easier a driving pin gets into positive locking engagement with a rim of a wheel to be serviced, the less effort has to be made by the operator to bring a pin into positive locking engagement.

Moreover, the arrangement of driving pins can lead to the fact, that no additional centering means has to be applied onto a rim of a wheel to be serviced. In such a case, when two or more driving pins reach engagement with recesses, in particular with bolt holes, the engaged driving pins can take over the centering of the central axis of the wheel onto the rotary axis of the wheel supporting and rotating means. Therewith, the engaged pins take over the tasks of radially locking a rim to be serviced onto the rim-side surface, and further of centering a rim onto the rim-side surface. Only a fixation means, for example a holder to hold a rim or a wheel down, has to take care for the axial fixation of a rim of a wheel to be serviced.

In a first variation of a preferred embodiment, the actuator means are rotatably decoupled from the rotatable wheel supporting and rotating means by a bearing member. Therewith, the actuator means are not forced to follow the rotating movement of the rotatable wheel supporting and rotating means. Furthermore, the bearing member provides the possibility to support the actuator means directly on a fixed and non-rotating frame of the tire service machine.

In a second variation of the preferred embodiment, the actuator means can be rotatably connected to the wheel supporting and rotating means. This leads to the fact, that the actuator means follow a rotational movement of the wheel supporting and rotating means.

Moreover, in one aspect of the present invention, the wheel supporting and rotating means comprises a rim-side plate and a driving shaft-side plate and wherein the actuator means actuates the driving shaft-side plate supporting the driving pins. The rim-side plate provides the rim supporting surface, and the driving shaft-side plate provides a driving shaft-side surface. Additionally, the wheel supporting and rotating means can provide one or more plates sharing the same rotary axis, and sharing said rotary axis with the driving shaft of the wheel service machine. Furthermore, it is possible that the rim-side plate and the driving shaft-side plate are adjacent to each other without any clearance in between. It is further possible, that the rim-side plate is spaced apart from the driving shaft-side plate in axial direction of the driving shaft. In an arrangement like this, the driving shaft-side plate, which is orientated perpendicular to the driving shaft of the wheel service machine, can be movable in axial direction of the driving shaft towards and away from the rim-side plate, while the rim-side plate is axially fixed relative to the driving shaft. Furthermore, also the rim-side plate can be movable in axial direction of the driving shaft towards and away from the driving-side plate, while the driving-side plate is axially fixed. However, other arrangements with more than two plates forming the wheel supporting and rotating means are possible with more than one plate being movable in axial direction of the driving shaft.

In a non-operative state while the actuator means are out of charge in an idle state, the driving pins rest in the openings provided in the wheel supporting and rotating means. During said non-operative state, the operator can easily lift a rim of a wheel to be serviced onto the wheel supporting and rotating means. In a preferred embodiment of the present invention, the rim-side ends of the driving pins form an approximately even surface with the rim supporting surface of the wheel supporting and rotating means in case the locking-pins are in a non-operative state. However, it is also possible, that the rim-side ends of the driving pins are recessed inside the rim supporting surface, in axial direction of the driving shaft, and the rim-side ends of the driving pins do not form an even surface with the rim supporting surface of the wheel supporting and rotating means. Further, it is also possible, that the rim-side ends of the driving pins protrude slightly from the rim supporting surface of the automatic locking system.

In case, the actuator means actuate for example the driving shaft-side plate, a plate moving spring can be provided, exerting a spring load in the region of the offset in axial direction provided between the rim-side plate and the driving shaft-side plate. This plate moving spring moves driving shaft-side plate in axial direction away from rim-side plate as soon as the actuating force gets loose. As soon as the driving shaft-side plate moves in axial direction of the driving shaft towards the tire service machine, also the driving pins are forced to follow the movement of the driving shaft-side plate and move inside the rim-side plate.

In the case when a vertical arrangement is chosen for a tire service machine, applied for example with a tire mounting machine, a plate moving spring can be avoided. As soon as the actuator means loose their actuating force, gravitation force pulls the driving shaft-side plate together with the driving pins in axial direction of the driving shaft towards the tire service machine. The driving pins are forced to follow the movement of the driving shaft-side plate and move inside the rim-side plate.

In another preferred aspect of the present invention, the actuator means comprises at least one actuator device comprising at least one actuator spring or at least one fluid driven actuator or at least one mechanical or electrical driven actuator as well as any possible combination thereof. The actuator means can either directly actuate the driving pins without means or parts in between, or indirectly such that the actuator means actuate a means onto or into which the driving pins are supported.

In case the actuator means directly actuate the driving pins, said driving pins move along the openings provided in the wheel supporting and rotating means, in a direction towards a rim of a wheel to be serviced, which is placed onto the wheel supporting and rotating means. Therefore, the actuator means have to be rotatably connected to the supporting and rotating means. Furthermore, an actuating force exerted by the actuator means has to be smaller than the weight force of a rim of a wheel to be serviced placed onto the rim supporting surface. Otherwise, the actuation of the driving pins by the actuator means would lead to a protrusion of each of the plurality of driving pins from the rim supporting surface.

In another possible embodiment of the present invention the driving pins are connected to the driving shaft-side plate, and the actuator means indirectly actuate the driving pins by actuating the driving shaft-side plate to move along the axial direction of the driving shaft. Therewith, the driving pins are moved in the axial direction of the driving shaft, too, and their rim-side ends are reversibly moved through the rim-side plate of the wheel supporting and rotating means, and the rim-side ends of the driving pins are adapted to protrude out of the rim-side plate. In such an arrangement, the pins are further compressively supported inside the driving shaft-side plate such that the pins can be compressed against, for example, a spring force of a spring mounted in between the driving pins and the support for the driving pins inside the driving shaft-side plate. Thereby, the actuating force, which has to be smaller than the weight force of a rim of a wheel (or of a wheel comprising a rim and a pneumatic tyre mounted thereon, sometimes referred to as wheel assembly) to be serviced, is represented by the cumulated spring force of each of the provided springs inside the driving shaft-side plate. Otherwise, also in this case, the driving pins would protrude from the rim supporting surface in the direction of a rim of a wheel to be serviced, when the wheel is placed onto the supporting and rotating means. An uplifted movement of a rim of a wheel to be serviced, caused by the axial movement of the driving pins, which would finally protrude out of the rim supporting surface of the rim-side plate could not, in this case, be prevented.

Furthermore, the force exerted by each spring, may be the same or different. In a preferred embodiment, the force exerted by each spring is the same. In any event, the cumulative force exerted by all springs has to be smaller than the weight force of a rim or of a wheel assembly of a wheel to be serviced.

In a further possible embodiment, the actuator means can directly actuate an elastic block, which itself is able to actuate the driving pins to move inside the rim-side plate of the wheel supporting and rotating means. The elastic block captures the function of firstly moving the driving pins in the direction of a rim of a wheel to be serviced, placed onto the wheel supporting and rotating means. Additionally, the elastic block is at least partially deformable in at least an axial direction of the rotary axis of the wheel supporting and rotating means. This leads to the fact, that the single driving pin protruding out of the rim-side surface of the rim-side plate against a surface of a rim of a wheel to be serviced, and therewith not finding a recess in a rim, can be sprung by the elastic block. Thereby, the elastic block can capture the features of the driving-side plate, together with the springs being provided between each of the driving pins and the driving-side plate.

As soon as the actuator means actuate the driving pins, the automatic anti-slipping system is transferred from a non-operative state into an operative state.

Furthermore, the wheel supporting and rotating means has a hole in axial direction coinciding with its rotary axis for housing a wheel clamping means. Therewith, the wheel supporting and rotating means offers the possibility to lock a rim of a wheel to be serviced, and also offers the possibility to clamp a rim of a wheel to be serviced by clamping means. Said clamping means for clamping a rim of a wheel to be serviced may be a rod having a cylindrical part being inserted through a center hole of the wheel supporting and rotating means with an extended end-part being able to hold a rim in its axial position, a self-locking device adapted to use the rotating movement of the driving shaft for actuating a clamping process, or any other possible means to temporarily hold and clamp a rim of a wheel to be serviced in its axial position, requiring a hole in axial direction coinciding with the rotary axis of the wheel supporting and rotating means.

In another aspect of the present invention, the wheel supporting and rotating means comprises chuck jaws to radially clamp a rim of a wheel to be serviced. In case, chuck jaws are provided on the wheel supporting and rotating means, a hole in axial direction coinciding with its rotary axis for housing a wheel clamping means is no longer obligatory, but can certainly be further provided. Furthermore, a winged screw being adapted to be screwed onto a threaded bar protruding in the direction of the rotary axis of the wheel supporting and rotating means can also be provided. The use of chuck jaws, together with for example a self-locking device adapted to use the rotating movement of the driving shaft for actuating a clamping process, or a cylindrical clamping rod with a cone as already explained above, takes care for axial fixation of a rim of a wheel to be serviced onto the wheel supporting and rotating means, and provides an automated method for automatic locking of a rim, and furthermore covers the function of centering a rim of a wheel to be serviced.

In case of the method, the drawbacks of the known art can be overcome by the features of claim 13.

An automatic anti-slipping method for a rotationally fixed attachment of a rim of a wheel in a wheel service machine comprises some steps. First, a rim of a wheel to be serviced having a central axis is arranged on wheel supporting and rotating means for supporting and rotating the wheel around its rotary axis. Further, actuator means are provided for moving reversibly driving pins which are provided at the wheel supporting and rotating means for reversibly generating a rotationally fixed connection between the wheel supporting and rotating means and a rim of a wheel to be serviced, and which are adapted to be reversibly movable in a direction parallel to the rotary axis of the wheel supporting and rotating means. Moreover, the at least two driving pins are actuated in an actuated state in which the driving pins can protrude from the rim supporting surface of the wheel supporting and rotating means by use of an actuator force which is chosen smaller than the weight force of a rim of a wheel to be serviced, and wherein at least one of the at least two driving pins is adapted to come reversibly in a positive locking engagement with at least one recess of a rim when coinciding with said recess of a rim.

As soon as the actuator means directly or indirectly actuate the driving pins, the driving pins are adapted to be reversibly moveable inside the opening of the wheel supporting and rotating means and protrude out of the rim-side plate of the wheel supporting and rotating means in the direction towards a rim. In case, the driving pins are actuated to move into their operative position for reaching operative state of the automatic anti-slipping system with a high actuating force exerted by the actuator means or the springs inside the cylindrical openings of the wheel supporting and rotating means, a rim of a wheel to be serviced would be lifted up from the wheel supporting and rotating means. This is not helpful while attempting to lock a rim of a wheel onto the wheel supporting and rotating means, and further a rim of a wheel being uplifted from the rim supporting surface tends to slip down from said wheel supporting an rotating means and provides therefore a risk for accidents. To prevent an uplifting movement of a rim of a wheel to be serviced from the wheel supporting and rotating means, the force pushing the driving pins in the direction towards a rim of a wheel placed onto the rim supporting surface has to be smaller than the weight force of a rim of a wheel to be serviced. In case, the driving pins are actuated directly by the actuator means, the actuating force exerted by the actuator means has to be smaller than the weight force of a rim of a wheel to be serviced. In case the driving pins are actuated indirectly, the cumulated force of the springs being provided between the driving pins and the wheel supporting means, in particular the driving shaft-side plate, has to be smaller than the weight force of a rim of a wheel to be serviced.

Because of the fact, that the actuating force of the directly actuated driving pins, or the cumulated spring force of springs provided in the supporting and rotating means of the indirectly actuated driving pins is smaller than the weight force of a rim of a wheel to be serviced, only a single driving pin, or even more driving pins, coinciding with a bolt hole or recess of a rim, actually protrudes out of the wheel supporting and rotating means through the bolt hole or recess. The other pins move directly against a surface of a rim of a wheel to be serviced, which is adjacent to the wheel supporting and rotating means and its rim supporting surface. Therewith, solely the driving pin, which is coinciding with a recess of a rim, which can be a bolt hole, is able to reach a positive locking engagement for a temporarily and rotationally fixed connection between a rim of a wheel and the supporting and rotating means. The number of driving pins being in a positive locking engagement with a rim is not restricted to one, but has to be at least one for proper positive locking engagement. The driving pin being in positive locking engagement with a bolt hole or recess of a rim provides a rotational fixation of a rim of a wheel to be serviced with the wheel supporting and rotating means. With a fixation of a rim of a wheel onto the wheel supporting and rotating means via a pin engaged in a rim, there cannot occur relative movement between a rim and the wheel supporting and rotating means, and therewith slipping of a rim of a wheel to be serviced onto the supporting and rotating means is prevented. When at least one driving pin comes into positive locking engagement with a recess in a rim of a wheel to be serviced, which can be a bolt hole, the wheel clamping means or chuck jaws are not needed to be tightened strongly, and therefore, damage on the surface of a rim of a wheel to be serviced, caused by wheel clamping means or chuck jaws, can be prevented. Besides the rotational movement of the driving shaft, the engaged driving pin transfers also driving torque for accelerating and decelerating a rim being placed onto the wheel supporting and rotating means.

As soon as the automatic anti-slipping system shall be transferred from an operative state where at least one drive pin is in engagement with a rim, into a non-operative state, the actuator means has to lower the actuating force. In case, the driving pins are actuated directly, this can be done easily by releasing the actuating force. For indirectly actuated driving pins, a plate moving spring provided between the rim-side plate and the driving shaft-side plate can be supportive, forcing the driving shaft-side plate to move back in non-operative position.

In another embodiment of the present invention, the rim supporting surface of the wheel supporting and rotating means comprises a high-friction lining adapted to increase friction between the rim supporting surface and a rim of a wheel to be serviced. With this high-friction lining, occurrence of slipping can further be reduced or avoided while transmission of torque between a rim of a wheel to be serviced and the wheel supporting and rotating means can be advantageously improved, because the high-friction lining takes over a part of torque transmission. Because of the fact, that bolt holes or recesses in a rim of a wheel to be serviced are generally wider in diameter than the driving pins, slight slipping between a rim and the wheel supporting and rotating means could occur, if no high-friction lining is applied onto the rim supporting surface. Furthermore, as soon as a rim of a wheel to be serviced is placed on the rim supporting surface, the high friction lining can prevent the user of the wheel service machine from inadvertently pushing a rim or wheel assembly onto the rim supporting surface, and therewith a rim can be prevented from being damaged.

The high-friction lining can be a coating applied to the rim supporting surface of the wheel supporting and rotating means. Furthermore, it is also possible, that the high-friction lining of the wheel supporting and rotating means is accomplished as a separate high-friction component adapted to be arranged removable between the rim supporting surface of the wheel supporting and rotating means and a rim of a wheel to be serviced. In this manner, an easy replacement of the high friction lining is possible. Additionally, the high-friction component according to the invention can be in positive locking engagement with the wheel supporting and rotating means so that an advantageous reliable torque transmission is provided.

Other advantages and one embodiment of the present invention shall now be described with reference to the attached drawings. The terms "top", "bottom", "up", "low", "left" and "right" used when describing the embodiment, relate to the drawings orientated in such a way that the reference numerals and name of the figures can be read normally.

DETAILED DESCRIPTION

Figure 1:
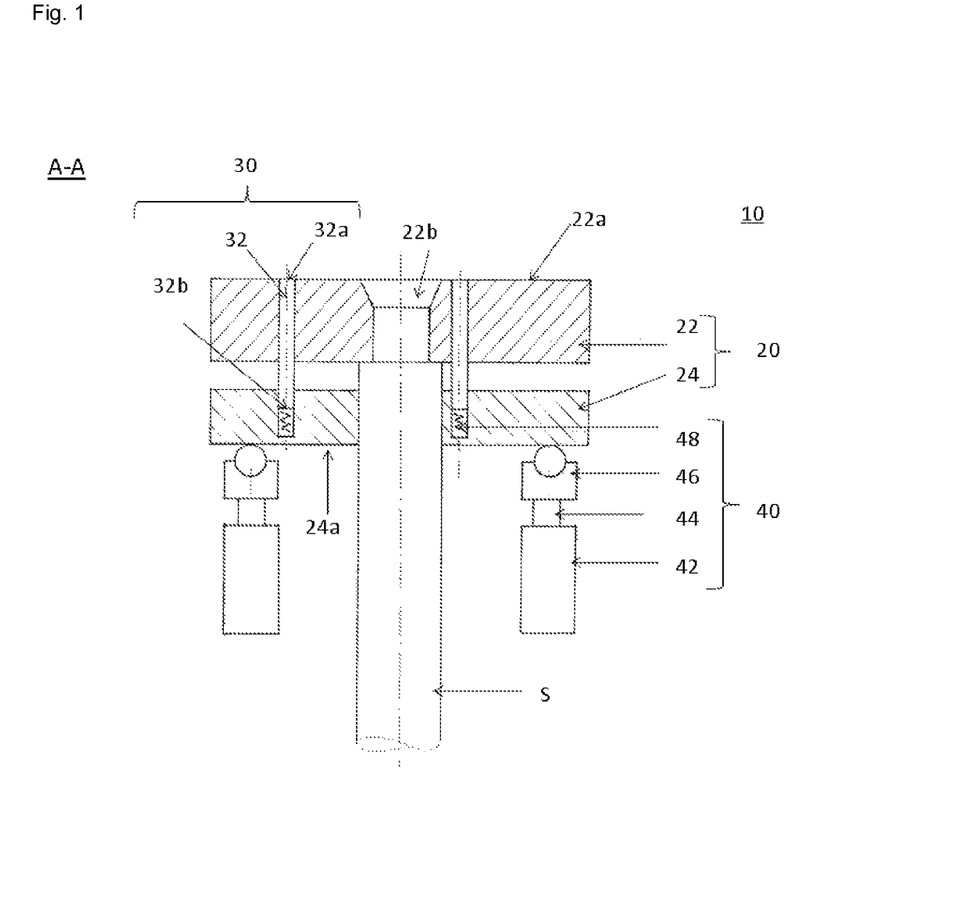
FIG. 1 shows a cross-sectional view of the automatic anti-slipping system according to an embodiment of the present invention in a non-operative state.

In the present embodiment shown in FIG. 1, an automatic anti-slipping system 10 represents a component of a tire mounting machine M (not shown) having a driving shaft S for providing a main driving force, but can also be used with any other tire service machine M. The inventive automatic anti-slipping system for use in a wheel service machine M as shown in FIG. 1 comprises as main components a wheel supporting and rotating means 20 where a rim of a wheel to be serviced is placed onto, engagement means 30, to which driving pins 32 belong, being able to partially engage a rim of a wheel to be serviced (not shown), and actuator means 40 actuating the engagement means 30, which are provided in the wheel supporting and rotating means 20. In the following, these components will be described in detail.

Wheel supporting and rotating means 20 are mainly disc shaped, and are fixedly mounted perpendicular onto driving shaft S of tire mounting machine M. Thus, wheel supporting and rotating means 20 are forced to follow a rotating movement of driving shaft S, where the center or rotary axis of wheel supporting and rotating means 20 is arranged coaxially with the respective center or rotary axis of driving shaft S of tire mounting machine M. Wheel supporting and rotating means 20 comprises a rim-side plate 22 having a rim supporting surface 22a onto which a rim of a wheel to be serviced can be placed, and a driving shaft-side plate 24 having a driving shaft-side surface 24a which forms the driving shaft-side end of wheel supporting and rotating means 20. As soon as a wheel to be serviced is centered on rim supporting surface 22a, the central axis of the wheel to be serviced coincide with the rotary axis of the wheel supporting and rotating means 20, and therefore coincide with the axis of the driving shaft S. Wheel supporting and rotating means 20 together with its rim-side plate 22 and driving shaft-side plate 24 are preferably made from steel.

In order to house a common wheel clamping rod for centrally clamping a rod of a wheel onto wheel supporting and rotating means 20, rim-side plate 22 has a clamping rod-shaped hole 22b located around the common axis with driving shaft S.

While rim-side plate 22 is rotationally and axially fixedly connected to driving shaft S, driving shaft-side plate 24 is rotationally fixedly connected to driving shaft S, but is adapted to be axially slidable on driving shaft S. Moreover, an offset in axial direction between rim-side plate 22 and driving shaft-side plate 24 is provided as soon as the wheel supporting and rotating means 20 are in a non-operative state as shown in FIG. 1.

In the shown embodiment, the engagement means 30 comprises a plurality of driving pins 32 having equal shape, being provided at the wheel supporting and rotating means 20 for locking a rim of a wheel to be serviced on the rotary axis of the wheel supporting and rotating means 20. The driving pins 32 are cylindrical formed, having a rim-side end 32a and an actuator-side end 32b, and are arranged such, that a middle axis of each single driving pin 32 is parallel to the axis of driving shaft S. Said actuator-side end 32b is supported in a blind hole cut in wheel supporting and rotating means 20, in particular in driving shaft-side plate 24. The blind hole cut in wheel supporting and rotating means 20 is accessible from rim supporting surface 22a. Driving pins 32 extend in a direction parallel to the axis of driving shaft S, from driving shaft-side plate 24 into rim-side plate 22, where driving pins 32 are axially reversibly movable. Because of the fact that the driving pins 32 are stuck in the blind hole, cut in driving shaft-side plate 24, they are adapted to follow the sliding movement of driving shaft-side plate 24 in axial direction along driving shaft S. In non-operative state where driving shaft-side plate 24 and rim-side plate 22 are offset from each other in axial direction, rim-side ends 32a of driving pins 32 form an even surface with rim supporting surface 22a of rim-side plate 22.

Figure 3:
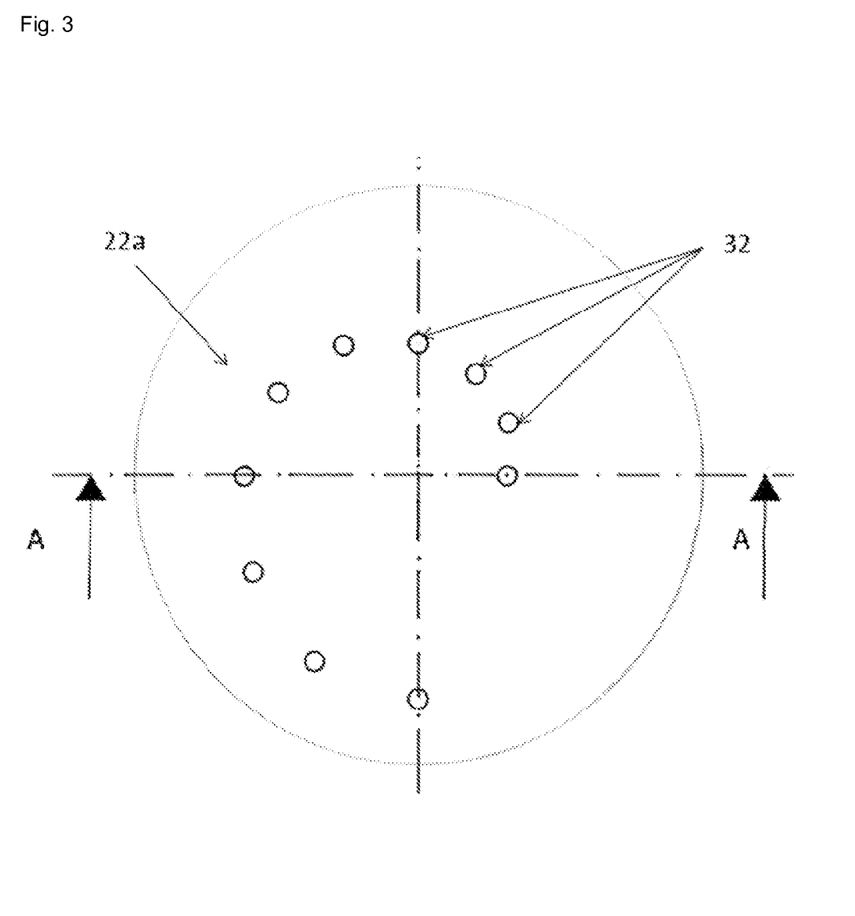
FIG. 3 shows a top view of a wheel supporting and rotating means of the automatic anti-slipping system shown in FIG. 1.
Figure 4:
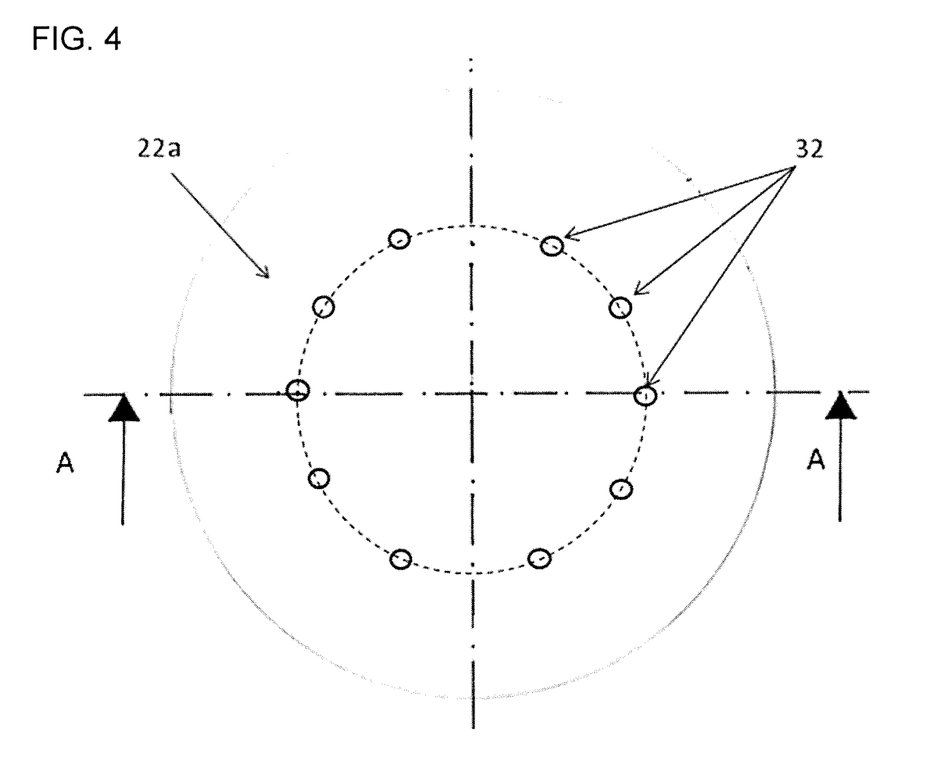
FIG. 4 shows a top view of a wheel supporting and rotating means of the automatic anti-slipping system shown in FIG. 1 providing an alternative arrangement of the driving pins with respect to FIG. 3.

The driving pins 32 are arranged, as can be seen in FIG. 3, in a helical arrangement around the common rotary axis of wheel clamping and rotating means 20 and driving shaft S. As already mentioned above, the middle axes of driving pins 32 are orientated parallel to the axis of driving shaft S. The driving pins 32 are preferably made from steel. Alternatively, the driving pins 32 may be arranged, as can be seen in FIG. 4, at equal radiuses referred to the common rotary axis of wheel clamping and rotating means 20 and driving shaft S.

Actuator means 40 are adapted to transfer the automatic anti-slipping system 10 for use in the tire mounting machine M from a non-operative state to an operative state and reverse. Therefore, actuator means 40 comprise at least one actuator device 42, in particular two actuator devices 42. The actuator device 42 which is provided by a pneumatic cylinder, is adapted to extend a piston rod 44 in a direction being parallel to the axis of driving shaft S towards the driving shaft-side plate 24. Furthermore, actuator device 42 of actuator means 40 is supported and fixedly connected to a fixed frame of tire mounting machine M. Pneumatic cylinders as used in actuator devices 42 are devices of the common art, and are, together with the piston rod, preferably made from steel.

On a forwardmost end of piston rod 44 in the direction of the driving shaft-side plate 24, a bearing member 46 is provided. Bearing member 46 enables a touching contact of rotationally and axially fixed actuator device 42 with driving shaft-side plate 24, following a rotational movement of driving shaft S. Bearing member 46 comprises a ball bearing, which directly contacts driving shaft-side surface 24a of driving shaft-side plate 24. Therewith, it is able that an extended position of piston rod 44 following an actuation of actuator device 42, lifts driving shaft-side plate 24 together with its driving pins 32 in the direction of axially fixed rim-side plate 22, such that the driving pins 32 protrude out of rim supporting surface 22a of rim-side plate 22. Ball bearing of bearing member 46 is preferably made from steel or ceramics, which may further need lubrication to overcome tribological stresses.

Moreover, driving pins 32 are further spring loaded by springs 48, which are part of the actuator means 40. The springs 48 are placed in the blind holes cut in wheel supporting and rotating means 20, in particular cut in driving shaft-side plate 24. Furthermore, driving pins 32 are placed against springs 48, and springs 48 are further placed against blind holes cut in wheel supporting and rotating means 20. This results in the fact that as soon as the pins 32 are forced by the actuator device 42 and the axial movement of driving shaft-side plate 24 to protrude out of rim supporting surface 22a of rim-side plate 22, pins 32 are further squeezable by a rim of a wheel to be serviced placed onto rim supporting surface 22a of wheel supporting and rotating means 20 against a spring force of spring 48.

The cumulative spring force of all applied springs 48 has to be smaller than the weight force of a rim or of a wheel assembly (i.e. a wheel and a pneumatic tyre mounted thereon) of a wheel to be serviced, which is put on the wheel supporting and rotating means 20.

Transferring in Operative State

As already mentioned above, the automatic anti-slipping system 10 can have two different states, an operative state and a non-operative state.

Figure 2:
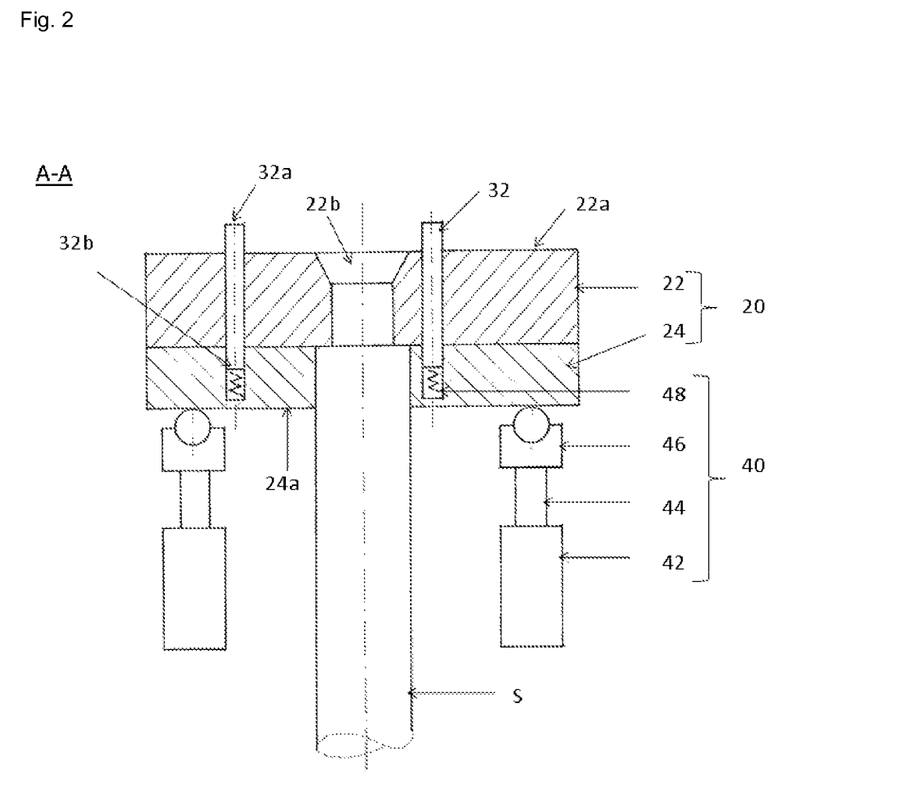
FIG. 2 shows a cross-sectional view of the automatic anti-slipping system according to the embodiment shown in FIG. 1 in an operative state.

Both states can be differentiated such that in non-operative state the rim-side end 32a of driving pins 32 form an even surface with rim supporting surface 22a of rim-side plate 22, and in operative state rim side ends 32a of driving pins 32 protrude from rim supporting surface 22a of rim-side plate 22.

While the automatic anti-slipping system 10 is in non-operative state and driving pins 32 form an even surface with rim supporting surface 22a of rim-side plate 22, a rim of a wheel or a tire to be serviced on the tire mounting machine M can easily be lifted onto the wheel supporting and rotating means 20. A clamping rod of common art can also be inserted in the clamping rod-shaped hole 22b of rim-side plate 22 but not finally fixed, so that a rim of a wheel to be serviced can preliminarily be held onto the wheel supporting and rotating means 20.

Further, actuator device 42 together with its pneumatic cylinder actuates piston rod 44 along with bearing member 46 to protrude out of actuator device 42. Because of the fact, that ball bearing of bearing member 46 directly touchingly contacts driving shaft-side surface 24a of driving shaft-side plate 24, driving shaft-side plate 24 is forced to follow the movement of bearing member 46 in a direction parallel to the axis of driving shaft S. Driving pins 32, which are supported in driving shaft-side plate 24, and are additionally spring loaded against driving shaft-side plate 24 by spring 48, are forced to follow the axial movement, too. Therewith, driving pins 32 are further forced to move in axial direction through axially fixed rim-side plate 22. The axial movement of piston rod 44 is adapted to correspond to the height of the offset in axial direction between rim-side plate 22, which is axially fixed, and driving shaft-side plate 24, which directly follows the axial movement of piston rod 44.

As soon as the actuating process of actuator device 42 is done, which means piston rod 44 together with bearing member 46 is expanded in axial direction, the offset in axial direction between rim-side plate 22 and driving shaft-side plate 24 is overcome, and the two plates are contacting.

Therewith, the driving pins 32 have been protruded from rim supporting surface 22a of rim-side plate 22. Because of the fact, that the weight force of a rim of a wheel to be serviced being placed onto the rim supporting surface 22a of the wheel supporting and rotating means 20 is higher than the cumulative spring force of springs 48, a driving pin 32 protrudes out of rim supporting surface 22a only in case said driving pin 32 coincides with a bolt hole or a recess in a rim to be serviced. As soon as a driving pin 32 coincides with a bolt hole or a recess in a rim and protrudes out of rim supporting surface 22a, driving pin 32 engages a rim to be serviced.

Together with the clamping rod being put in the clamping rod-shaped hole 22b of rim-side plate 22 which can now be tightened, fixation of a rim of a wheel to be serviced on the tire mounting machine M can be provided. The engaged driving pin provides transfer of rotary motion from the driving shaft S, as well as acceleration and decelerating torque. In the following, any wheel service proceedings, in particular a tire mounting proceeding, can be executed.

Transferring from Operative State in Non-Operative State

For releasing and demounting a rim of a wheel to be serviced, for example as soon as the operation run is finished, the pneumatic cylinder of actuator device 42 pulls piston rod 44 together with bearing member 46 in axial direction back into the housing of pneumatic cylinder. Therewith, driving shaft-side plate 24 is not further pushed by piston rod 44 against rim-side plate 22.

According to the vertical arrangement of the tire mounting machine M of the present embodiment, assembled with the automatic anti-slipping system 10, driving shaft S extends vertically. Thereby, rim supporting surface 22a being perpendicular to driving shaft S, is orientated horizontally. As soon as driving shaft-side plate 24 is no longer pushed against rim-side plate 22, driving shaft-side plate 24 moves along driving shaft S in axial direction against the tire mounting machine M as a consequence of gravitational force. Together with driving shaft-side plate 24, also driving pins 32 move inside rim-side plate 22, following the axial movement of driving shaft-side plate 24. Thereby, the at least one driving pin 32 which has been engaged with a rim of a wheel to be serviced, looses its positive locking engagement into a rim of a wheel.

As soon as the clamping rod is removed from clamping rod-shaped hole 22b, a rim of a wheel can be removed from rim supporting surface 22a of wheel supporting and rotating means 20.

REFERENCE LIST 10 automatic anti-slipping system
20 wheel supporting and rotating means
  22 rim-side plate
    22a rim supporting surface
    22b clamping rod-shaped hole
  24 driving shaft-side plate
    24a driving shaft-side surface
30 engagement means
  32 drive pin
    32a rim-side end
    32b actuator-side end
40 actuator means
  42 actuator device
  44 piston rod
  46 bearing member 48 spring
M tire mounting machine
S driving shaft

The invention claimed is:

1. An automatic anti-slipping system for a rotationally fixed attachment of a rim of a wheel in a wheel service machine, comprising:
    a wheel support having a rotary axis, for supporting and rotating a wheel to be serviced, the wheel support including a rim-side plate and a driving shaft-side plate axially slidable relative to the rim-side plate in a direction parallel to the rotary axis between an offset non-operative state and a non-offset operative state, wherein a rim of a wheel to be serviced can be placed onto a rim supporting surface of the rim-side plate,
    at least two driving pins being supported in the driving shaft-side plate for reversibly generating a rotationally fixed connection during operation between the wheel support and a rim of a wheel to be serviced, wherein at least one of the at least two driving pins is adapted to come in a positive locking engagement with at least one recess of a rim when coinciding with said recess of a rim, and wherein the at least two driving pins are adapted to be reversibly moveable in a direction parallel to the rotary axis of the wheel support,
    actuators being able to reversibly move the driving shaft-side plate together with the driving pins relative to the rim-side plate between said non-operative state in which an end of each of the driving pins does not substantially protrude out of the rim supporting surface and said operative state in which said ends protrude out of rim supporting surface, and
    wherein the actuators actuating the driving pins exert an actuating force which is smaller than the weight force of a rim or a wheel or a wheel assembly to be serviced.

2. The system as claimed in claim 1, wherein the driving pins are arranged at equal radiuses referred to the rotary axis of the wheel support.

3. The system as claimed in claim 1, wherein the driving pins are arranged at different radiuses referred to the rotary axis of the wheel support.

4. The system as claimed in claim 1, wherein the driving pins are arranged at equal distances in circumferential direction around the rotary axis of the wheel support.

5. The system as claimed in claim 1, wherein the driving pins are arranged at different distances in circumferential direction around the rotary axis of the wheel support.

6. The system as claimed in claim 1, wherein the at least two driving pins comprise at least three driving pins for reversibly generating the rotationally fixed connection between the wheel support and the rim of the wheel to be serviced, wherein at least one of the at least three driving pins is adapted to come in the positive locking engagement with the at least one recess of the rim when coinciding with said recess of the rim, and wherein the at least three driving pins are adapted to be reversibly moveable in the direction parallel to the rotary axis of the wheel support, and
    wherein the driving pins are arranged in helical shape around the rotary axis of the wheel support.

7. The system as claimed in claim 6, wherein the at least three driving pins generate a rotationally fixed connection between the wheel support and the rim of the wheel to be serviced during rotation of the wheel to be serviced.

8. The system as claimed in claim 1, wherein the actuators are reversibly rotatably coupled to the driving shaft-side plate by a bearing member.

9. The system as claimed in claim 1, wherein the actuators comprise at least one actuator device comprising at least one of, a fluid driven actuator, and a mechanical or electrical driven actuator.

10. The system as claimed in claim 1, wherein the at least two driving pins generate a rotationally fixed connection between the wheel support and the rim of the wheel to be serviced during rotation of the wheel to be serviced.

11. An automatic anti-slipping method for a rotationally fixed attachment of a rim of a wheel in a wheel service machine comprising the steps of:
    arranging a rim of a wheel to be serviced on wheel support having a rotary axis, for supporting and rotating the wheel, the wheel support including a rim-side plate and a driving shaft-side plate axially slidable relative to the rim-side plate in a direction parallel to the rotary axis between an offset non-operative state and a non-offset operative state, wherein a rim of a wheel to be serviced can be placed onto a rim supporting surface of the rim-side plate,
    providing at least two driving pins supported in the driving shaft-side for reversibly generating a rotationally fixed connection during operation between the wheel support and a rim of a wheel to be serviced, wherein at least one of the at least two driving pins is adapted to come in a positive locking engagement with at least one recess of a rim when coinciding with said recess of a rim, and wherein the at least two driving pins are adapted to be reversibly moveable in a direction parallel to the rotary axis of the wheel support,
    providing actuators for reversibly moving the at least two driving pins, and
    actuating the actuators to reversibly move the driving shaft-side plate together with the driving pins relative to the rim-side plate between said non-operative state in which an end of each of the driving pins does not substantially protrude out of the rim supporting surface and said operative state in which said ends protrude out of rim supporting surface,
    wherein the step of actuating the actuators is carried out by making use of an actuator force which is smaller than the weight force of a rim or a wheel or a wheel assembly to be serviced.

12. The method as claimed in claim 11, further comprising:
    maintaining the driving pins in said operative state while rotating the wheel support to provide the positive locking engagement with the at least one recess of the rim.

* * * * *